US012573866B2

(12) United States Patent
Nguyen et al.

(10) Patent No.: US 12,573,866 B2
(45) Date of Patent: Mar. 10, 2026

(54) BATTERY SYSTEM FOR OPERATING POINT CONTROL OF POWER SYSTEMS

(71) Applicant: Exro Technologies Inc., Calgary (CA)

(72) Inventors: Tung Nguyen, Calgary (CA); Eric Hustedt, Calgary (CA)

(73) Assignee: Exro Technologies Inc., Calgary (CA)

( * ) Notice: Subject to any disclaimer, the term of this patent is extended or adjusted under 35 U.S.C. 154(b) by 0 days.

(21) Appl. No.: 18/945,147

(22) Filed: Nov. 12, 2024

(65) Prior Publication Data

US 2025/0167573 A1 May 22, 2025

Related U.S. Application Data

(60) Provisional application No. 63/600,243, filed on Nov. 17, 2023.

(51) Int. Cl.
*H02J 7/00* (2006.01)

(52) U.S. Cl.
CPC .......... *H02J 7/0063* (2013.01); *H02J 7/0068* (2013.01); *H02J 2300/26* (2020.01); *H02J 2300/30* (2020.01)

(58) Field of Classification Search
CPC .......... H02J 7/00; H02J 7/0063; H02J 7/0068; H02J 2300/26; H02J 2300/30
See application file for complete search history.

(56) References Cited

U.S. PATENT DOCUMENTS

| | | | |
|---|---|---|---|
| 8,680,838 B2 | 3/2014 | Saussele | |
| 2023/0047209 A1 | 2/2023 | Braun et al. | |

FOREIGN PATENT DOCUMENTS

| | | |
|---|---|---|
| AU | 2018101036 | 10/2018 |
| CN | 202841012 | 3/2013 |

OTHER PUBLICATIONS

Byunggyu Yu et al., "Power dissipation analysis of PV module under partial shading", International Journal of Electrical and Computer Engineering (IJECE), vol. 11, No. 2, Apr. 2021, pp. 1029-1035.
Adel A. Elbaset, et al. "Adapting On-site Induction Motor Pumping Loads with Standalone Photovoltaic Power for the Most Optimal Operation", 17th International Middle-East Power System Conference, (MEPCON'15), Mansoura University, Egypt, Dec. 15-17, 2015.

*Primary Examiner* — Robert L Deberadinis
(74) *Attorney, Agent, or Firm* — Cozen O'Connor

(57) ABSTRACT

A DC power system includes a first interface to a DC source and a second interface coupled to the first interface and to a load. A battery control system (BCS) has an input/output interface coupled to the first interface and to the second interface, and a series arrangement of switched controllable units of one or more battery cells, each switchably bypassable according to a control signal. The BCS selectively sources and sinks power to variably control a voltage at the input/output interface utilizing the plurality of switched controllable units under control of a BCS processor that produces the control signal. The BCS sources power from the switched controllable units to supply power to the load in addition to, or in lieu of, the DC source, and regulates performance of an external circuit by dynamic variation of the voltage at the input/output interface according to the control signal.

26 Claims, 15 Drawing Sheets

155

MULTIPLEXING
CIRCUIT *N*

204N

+

-

DCBUS+

⋮

MULTIPLEXING
CIRCUIT 2

204B

+

-

MULTIPLEXING
CIRCUIT 1

204A

+

-

DCBUS-

MULTIPLEXING CIRCUITRY

MUX
CONTROLLER

208

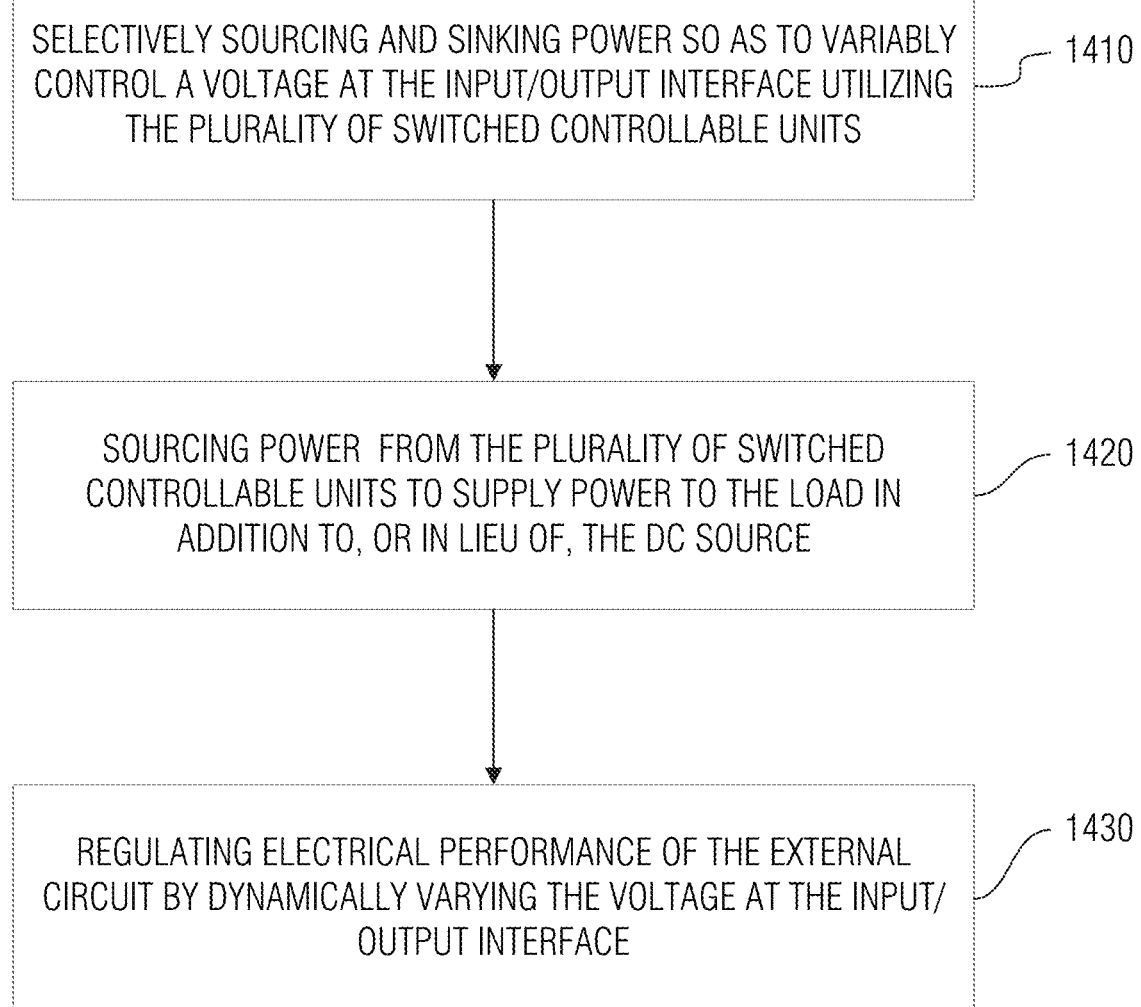

SELECTIVELY SOURCING AND SINKING POWER SO AS TO VARIABLY CONTROL A VOLTAGE AT THE INPUT/OUTPUT INTERFACE UTILIZING THE PLURALITY OF SWITCHED CONTROLLABLE UNITS ⌐ 1410

SOURCING POWER FROM THE PLURALITY OF SWITCHED CONTROLLABLE UNITS TO SUPPLY POWER TO THE LOAD IN ADDITION TO, OR IN LIEU OF, THE DC SOURCE ⌐ 1420

REGULATING ELECTRICAL PERFORMANCE OF THE EXTERNAL CIRCUIT BY DYNAMICALLY VARYING THE VOLTAGE AT THE INPUT/ OUTPUT INTERFACE ⌐ 1430

*FIG. 14*

BATTERY SYSTEM FOR OPERATING POINT CONTROL OF POWER SYSTEMS

CROSS REFERENCE TO RELATED APPLICATIONS

This application claims the benefit of U.S. Provisional Application No. 63/600,422 filed Nov. 17, 2023, the disclosure of which is incorporated by reference herein.

TECHNICAL FIELD

The present disclosure generally relates to supply of electrical power and, more particularly, to systems and methods that utilize battery systems in conjunction with other power sources.

BACKGROUND

Certain electricity generation technologies, such as photovoltaics (PV), thermophotovoltaics (TPV), wind turbines, and fuel-cell systems, produce power at varying efficiency depending on the loading, environmental conditions, and system-specific variables. For example, in the case of PV or TPV, the maximum power point varies based on the irradiance and condition of the cell (e.g., operating temperature, cleanliness, degradation). In wind turbines, the maximum power point varies based on operating temperature, wind speed, air turbulence, and mechanical condition such as lubrication or condition of the bearings. Fuel cell maximum power point depends on operating temperatures.

Since all of these factors are variable, power-system designers have proposed various techniques to manage the operating point of the power-generation system. One type of optimization technique is referred to as maximum power point tracking (MPPT), and typically includes a control system with a DC-DC converter situated in-circuit between the power source and the load. The load may be a power grid, an off-grid private power system, certain equipment, or the like, and may be a DC load or an AC load. In the case of the latter, a DC-AC inverter may be provided to produce an AC power waveform from a DC power input.

In MPPT, the load impedance, as seen from the power generation source, is varied by a control system to provide the greatest power transfer efficiency (the "maximum power point") as the conditions change. Variation of the load impedance as presented to the power source may be accomplished by controlling the operation (e.g., duty cycle) of an input of a switching-mode DC-DC converter.

The power demand of a load may be greater than the maximum power point of a power generator. In this case, the MPPT controller may simply limit the power drawn from the generator, and additional power may be supplied from a different power source. In other use cases, the maximum power point of a source may be greater than the power demand of the load. In such situations, the MPPT controller may divert excess power from the generator to an additional load so that the power source may be operated at its maximum power point. Battery systems may be advantageously used as an additional power source, or as an additional load. Thus, when the power demands of the load exceed the maximum power output of the generator, the battery system may be used to supplement such demand. Likewise, when excess power is available from the generator, it may be used to charge the battery cells of the battery system.

Conventional deployments of a battery system with a power-generation system use DC-DC power conversion to achieve a proper charging voltage or current for the battery, and to convert the output voltage of the battery to match the requirements of the load. DC-DC converters add complexity and cost to power systems. In addition, they tend to reduce the power system's overall efficiency by 5-15%, depending on their operating point. Accordingly, it would be advantageous to provide a practical power system that uses a battery system but that omits a DC-DC converter.

SUMMARY

In some aspects, the techniques described herein relate to a DC power system including: a first interface to a DC source; a second interface electrically coupled to the first interface and to a load; a battery control system (BCS) having an input/output interface electrically coupled to the first interface and to the second interface; the BCS including a series arrangement of a plurality of switched controllable units of one or more battery cells, wherein each controllable unit is switchably bypassable according to a control signal; the BCS operative to selectively source and sink power so as to variably control a voltage at the input/output interface utilizing the plurality of switched controllable units under control of a BCS processor that produces the control signal; the BCS processor operative to source power from the plurality of switched controllable units to supply power to the load in addition to, or in lieu of, the DC source; and the BCS processor operative to regulate electrical performance of an external circuit electrically coupled to the input/output interface by dynamic variation of the voltage at the input/output interface according to the control signal.

In related aspects, the techniques described herein relate to a method for operating a DC power system that includes a DC source, and a series arrangement of a plurality of switched controllable units of one or more battery cells, wherein each controllable unit is switchably bypassable according to a control signal, and an input/output interface that couples the series arrangement to a load, the method including: by the DC power system, selectively sourcing and sinking power so as to variably control a voltage at the input/output interface utilizing the plurality of switched controllable units; sourcing power, by the DC power system, from the plurality of switched controllable units to supply power to the load in addition to, or in lieu of, the DC source; and regulating, by the DC power system, electrical performance of the external circuit by dynamically varying the voltage at the input/output interface.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 14 is a flowchart illustrating an example method for operating a DC power system.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc.

Reference throughout this specification to "an embodiment", "one embodiment", "one implementation", "one aspect", or "an implementation" means that a particular feature, structure or characteristic described in connection with the implementation is included in at least one implementation. Thus, the appearances of the phrases "in one implementation", "in an implementation", "in one aspect", "in an example", "in an embodiment", or the like, in various places throughout this specification are not necessarily all referring to the same implementation. Furthermore, particular features, structures, or characteristics may be combined in any suitable manner in one or more implementations.

Unless the context requires otherwise, throughout the specification and claims that follow, the word "comprising" or "comprises" is synonymous with "including" or "includes" and is inclusive or open-ended (i.e., does not exclude additional, unrecited elements or method acts).

As used in this specification and the appended claims, the singular forms "a," "an," and "the" include plural referents unless the content clearly dictates otherwise. It should also be noted that the term "or" is generally employed in its inclusive-or sense (i.e., "and/or"), unless an exclusive-or interpretation is expressly and unambiguously set forth.

The headings and Abstract of the Disclosure provided herein are for convenience only and do not interpret the scope or meaning of the embodiments.

System Overview

Figure 1A:
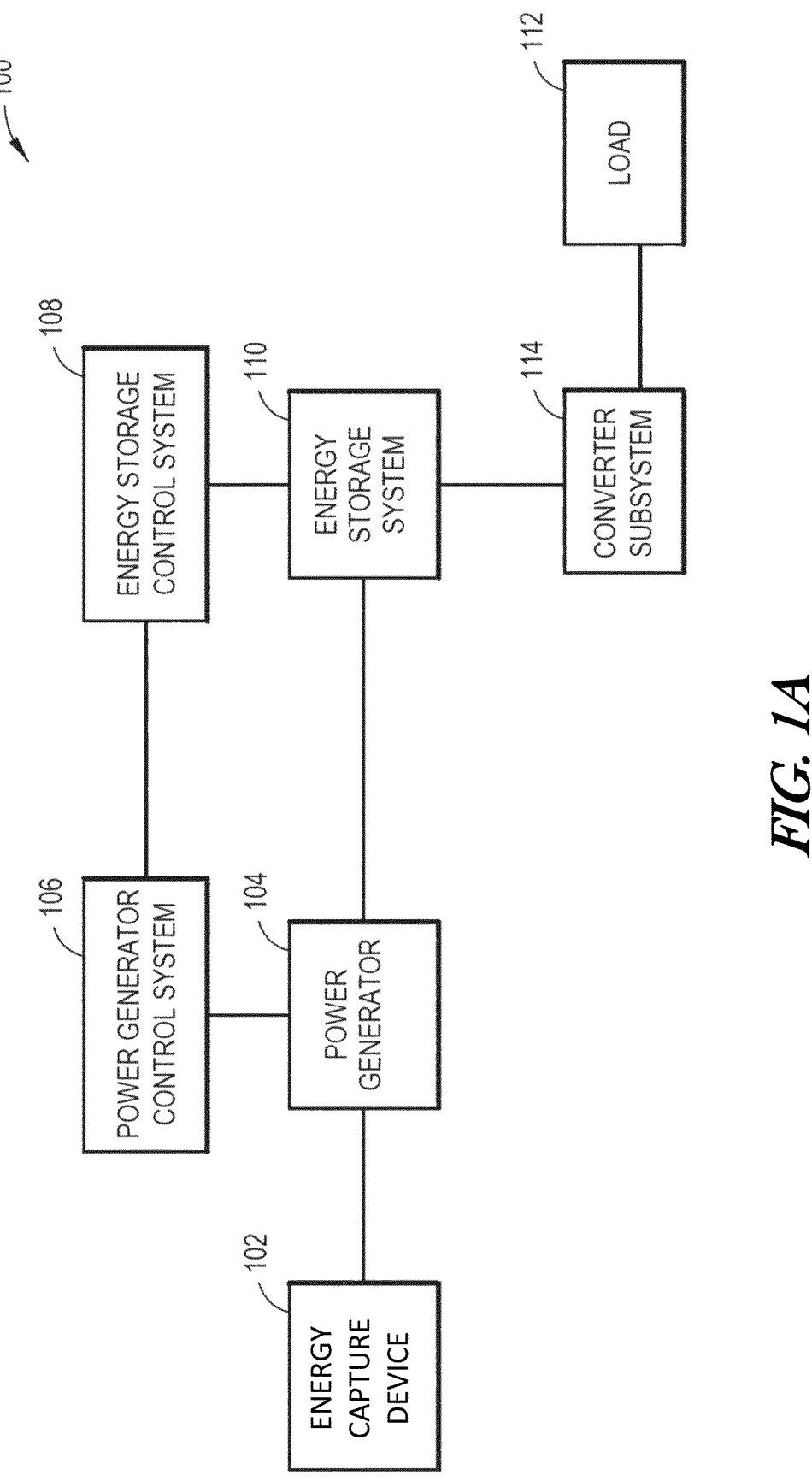
FIG. 1A is a block diagram illustrating a system in which electrical power is generated and stored in a plurality of battery cells according to one or more implementations.

FIG. 1A is a block diagram illustrating a system 100 in which electrical power is generated and stored in a plurality of battery cells according to one or more implementations. The system 100 includes an energy-capture device 102, a power generator 104, a power generator control system 106, an energy storage system 110, an energy storage control system 108, and a load 112.

The energy-capture device 102 may be a mechanical energy source, such as a turbine or other rotational element that, as a result of being rotated, provides mechanical energy via corresponding rotation of a rotor or shaft to the power generator 104. The power generator 104 includes a stator generating electrical power as a result of the mechanical energy received from the mechanical energy-capture device 102. Relative operation of the mechanical energy-capture device 102 and the power generator 104 is described in U.S. Pat. No. 8,878,373, which is incorporated herein by reference.

In related embodiments, the energy-capture device 102 and power generator 104 may be integrated as a singular system. For example, in some implementations, the energy-capture device 102 and power generator 104 may be a photovoltaic (i.e., solar) energy-capture system, which receives solar energy, and produces an electrical power output.

As described in further detail, the power generator 104 includes a plurality of solid-state electronic modules that are operative to selectively output a power signal based on power output of the power generator 104.

Although the power generator control system 106 and the energy system control system 108 are described and depicted as being distinct control systems, the power generator control system 106 and the energy system control system 108 may be part of a single control system in at least some implementations that control the power generator 104 and energy storage system 110.

The power generator control system 106 is communicatively and electrically coupled to the power generator 104 to control power output therefrom. In particular, the power generator control system 106 is electrically communicatively coupled to controllers of the solid-state electronic modules of the power generator 104 via an interface to control the output of the solid-state electronic modules. In at least some implementations, the power generator control system 106 may interact with the solid-state electronic modules to change a topology configuration of the solid-state electronic modules. The topology configuration refers to the relative arrangement of components of the solid-state electronic modules. Modifying the topology configuration changes the current and voltage characteristics of output power waveform generated by the solid-state electronic modules.

The energy storage system 110 comprises a plurality of battery cells, and switches that are operable to selectively control the charging and discharging of individual battery cells or commonly-controllable groups of battery cells as individually-controllable units. For the sake of brevity, the individual battery cells in the present description represent individually controllable units (e.g., which are switchable into, or bypassed, in the greater battery circuit composed of a combination of switchable units). It should be understood that, in the present context, each mention of a "cell," "battery cell" or "individual battery cell" refers to an individually-controllable unit of one or more physical cells, unless a different meaning is expressly set forth.

A switch may be associated with each battery cell in some implementations that is operable to selectively connect the battery cell with one or more terminals of other battery cells to organize sets of battery cells into a desired topology for charging or discharging the battery cells. Using the switches, the battery cells may be selectively engaged with, or disengaged from, each other, selectively engaged with or disengaged from input of the energy storage system 110, or selectively engaged with or disengaged from output of the energy storage system 110. In some implementations, the switches include one or more solid-state switches, such as metal-oxide-semiconductor field-effect transistors (MOS-FETs), bipolar junction transistors (BJTs), insulated-gated bipolar junction transistors (IGBT), thyristors (e.g., silicon controlled rectifiers), diodes, triodes, or the like. In some implementations, the switches may also include electromechanical switches, such as multi-throw switches, contactors, or relay switches.

The topology of a set of battery cells may be dynamically reconfigured to achieve the desired waveform of output voltage or output current capacity based on charging or discharge characteristics of the battery cells, and on the state-of-health of the battery cells.

The system 100 may include a converter subsystem 114 that selectively provides power from the power generator 104 or the energy storage system 110 to the load 112. The converter subsystem 114 may include a set of power converters that can convert DC provided from the energy storage system 110 into alternating current (AC) to be provided to the load 112. The converter subsystem 114 may also include a second set of converters to convert power supplied from the power generator 104 into a different form for provisioning to the load 112. The first and second sets of power converters of the converter subsystem 114 may operate in concert with one another to provide the desired output—for instance, the first set of power converters may convert DC from the energy storage system 110 into AC having a set of desired electrical characteristics (e.g., frequency, current capacity, voltage level, phase) and the second set of power converters may convert AC or DC from the power generator 104 into AC having the same set of desired electrical characteristics. The power converters may include a set of electronic switching components, as described in U.S. Pat. No. 8,878,373.

The converter subsystem 114 may be controlled by a control system in communication with the energy storage control system 108 and the power generator control system 106. The control system controlling the converter subsystem 114 may obtain information regarding power requirements of the load 112 or expected power requirements of the load 112 and interact with the energy storage control system 108 and the power generator 104 to determine how to satisfy the power requirements or expected power requirements. The control system controlling the converter subsystem 114 may be part of a control system that includes the power generator control system 106 or the energy storage control system 108. In such implementations, the larger control subsystem may be part of an integrated system that generates electrical power, stores electrical power (i.e., in the energy storage system 110), determines power requirements of the load 112, and interacts with the constituent parts of the system to optimize performance of the system.

Each control system 106, 108, (as well as any other control system or "controller" described herein) may include a digital controller that includes one or more processing devices (e.g., microprocessor core(s)), random-access memory, non-volatile data storage, input/output circuitry, and system-interconnect circuitry, arranged according to a suitable architecture. The respective control system's circuitry may be implemented as a microcontroller system with in which these components are integrated as a singular packaged integrated circuit (IC) or provided as a chipset. Notably, the non-volatile data storage contains instructions executable by the microprocessor core(s) that, when executed, transform the control circuitry into a special-purpose controller that implements one or more control algorithms, portions of which are described below.

In related embodiments, one or both of the control systems 106, 108 may be distributed over multiple devices, each having respective processor circuitry and instructions which carry out a respective portion of that control system's algorithm(s). For example, consistent with some of the embodiments described below, the energy storage control system 108 may be implemented with a first portion executing at the inverter 152 (FIG. 11B), while other portions are executing at each battery module 154. Likewise, a central controller 162 may provide supervisory control of the distributed portions of the overall energy storage control system 108.

Battery Control System Embodiments

Figure 1B:
FIG. 1B is a diagram illustrating overall hardware architecture for a battery control system (BCS) as an example of the system of FIG. 1A, according to one type of embodiment.

FIG. 1B is a diagram illustrating an example of an overall hardware architecture for a battery control system (BCS) 150 according to an embodiment. BCS 150 is an implementation of energy storage system 110, energy storage control system 108, and converter subsystem 114. The BCS 150 can be constructed in single phase or multi-phase system. As depicted, BCS 150 includes phases 160A, 160B, and 160C. Each phase 160 may include an inverter 152, which is an implementation of the converter subsystem 114, and n battery modules 154, with each module 154 containing m battery cells 156, making the system contain a total of n×m battery cells. Multiplexing circuitry 155 may be provided in each module 154 to perform switching of the controllable units, and to communicate with the inverter 152 and central BCS controller 162 by suitable communication protocol.

Central BCS controller 162 is operative to coordinate the overall operation of BCS 150, including commanding lower-level controllers to perform local operations within the purview of those local controllers. In one aspect, central BCS controller 162 may control the charging and discharging state, and the and duration of such states, of each controllable unit which is enabled for operation within BCS 150. The central BCS controller 162 may selectively place or remove different numbers of controllable units into or out of the greater circuit for charging or discharging, thereby varying the overall battery voltage of the BCS 150.

A wire harness system 158 provides electrical interconnection between all battery modules 154 and the inverter 152.

Figure 2:
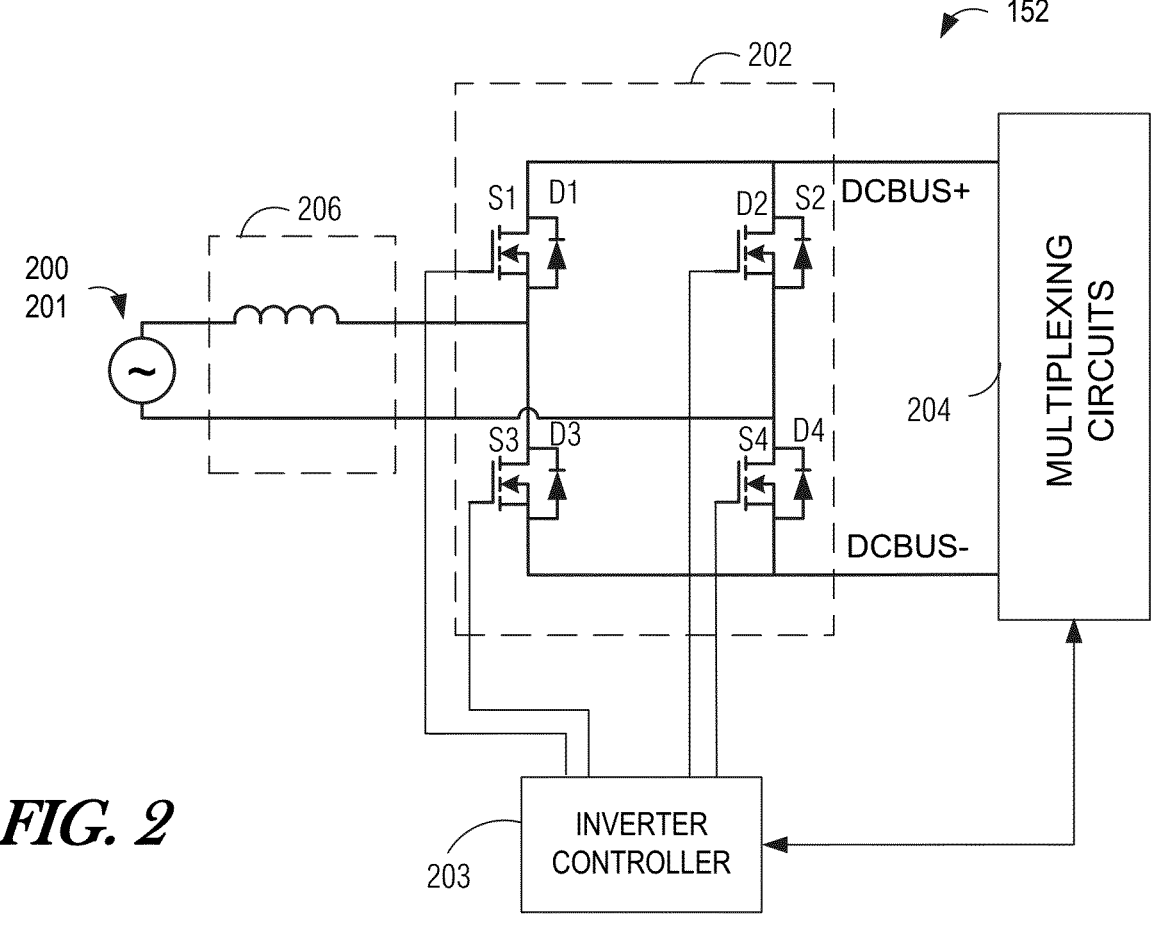
FIG. 2 is a simplified schematic diagram illustrating a portion of an inverter according to an example.

FIG. 2 is a simplified schematic diagram illustrating a portion of inverter 152 according to an example. The inverter 152 may work to transfer power from a power source to charge battery cells 156, or to discharge battery cells 156 into a load. The circuit includes a full H-bridge and full-wave rectifier topology 202. The input or output of the circuit, respectively, is connected to an energy source or load 200, 201. The energy source or load 200, 201 may be an electrical grid which at one time can supply power to the BCS 150, and at another time, draw power from BCS 150, through filtering components 206. Terminals DCBUS+ and DCBUS− are coupled to multiplexing circuits 204.

The switching elements S1-S4 are may each be implemented with one or more semiconductor switching devices of a type as discussed above. The diodes D1-D4 may be implemented with discrete components or they may be integral to their respective switching elements S1-S4.

The H-bridge arrangement of the switching elements S1-S4 is used to provide alternating current from the unidirectional current output from the battery cells of the BCS 150.

The inverter 152 rectifies the negative grid voltage to a positive voltage to connect with the battery cells 156 via the multiplexing circuits 204. In this function, the switching frequency may be twice the grid frequency, resulting in negligible switching loss, which is typically a significant loss in a regular switching mode inverter.

In the example depicted, the inverter 152 includes an inverter controller 153. The inverter controller 153 is arranged, as shown, to control each of the switching elements S1-S4. In some implementations, the inverter controller 203 may be interfaced with the multiplexing circuits 204 to read sensed conditions and other battery cell information, and to command the switching of battery cells. To this end, the multiplexing circuits 204 may include communication circuitry (e.g., a microcontroller that includes a universal asynchronous receiver transmitter (UART), amplification/line-driver circuitry) to implement the physical layer and protocol stack, as appropriate.

The inverter 152 may also regulate or provision the charging or load current. In some embodiments, following a setpoint provided by an external controller, discussed below, to charge or discharge battery cells.

In a related embodiment, inverter 152 may be an H-bridge-based motor drive, such as a variable-frequency motor drive, which may be employed in a machine, electric vehicle (EV), or appliance, for example. The motor drive may implement a regenerative-braking operating regime, such as a 4-quadrant motor control.

Figure 3:
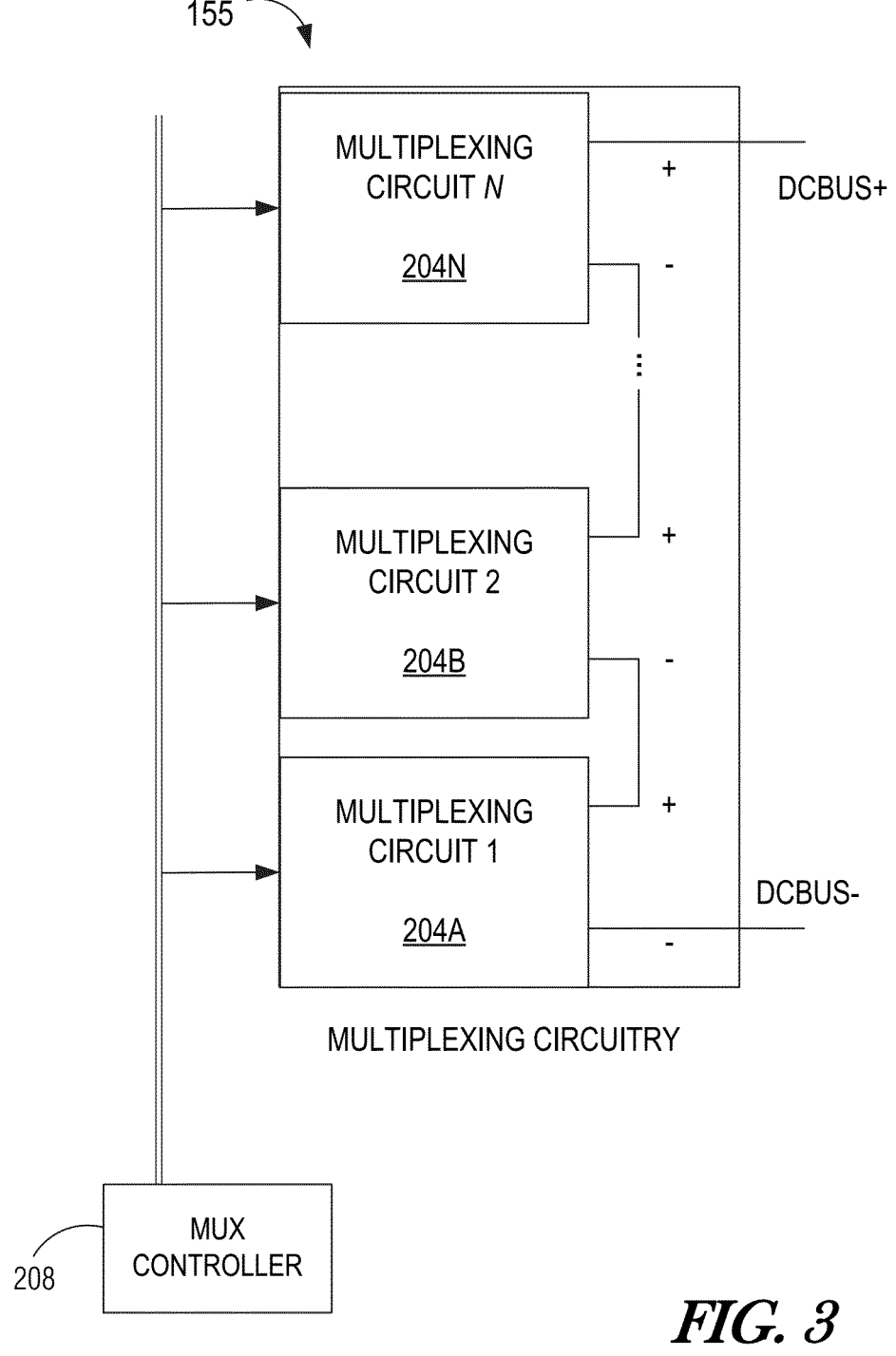
FIG. 3 is block diagram illustrating a multiplexing circuit of the BCS of FIG. 1B according to an example.

FIG. 3 is a diagram illustrating multiplexer circuitry 155 according to an example arrangement. The multiplexing circuitry 155 contain individual circuits multiplexing circuits 204A, 204B, . . . , 204N, which may be arranged in serial fashion according to one example, as depicted. Other arrangements are contemplated in other embodiments, such as combination series/parallel topologies. Each one of the individual multiplexing circuits 204 controls one or more controllable units of one or more battery cells. Multiplexing controller 208 generates control signaling for the individual multiplexing circuits 204 A, 204B, . . . , 204N based on command signaling received, for example, from central BCS controller 162 (FIG. 1B) or inverter controller 203, according to various embodiments.

Figure 4:
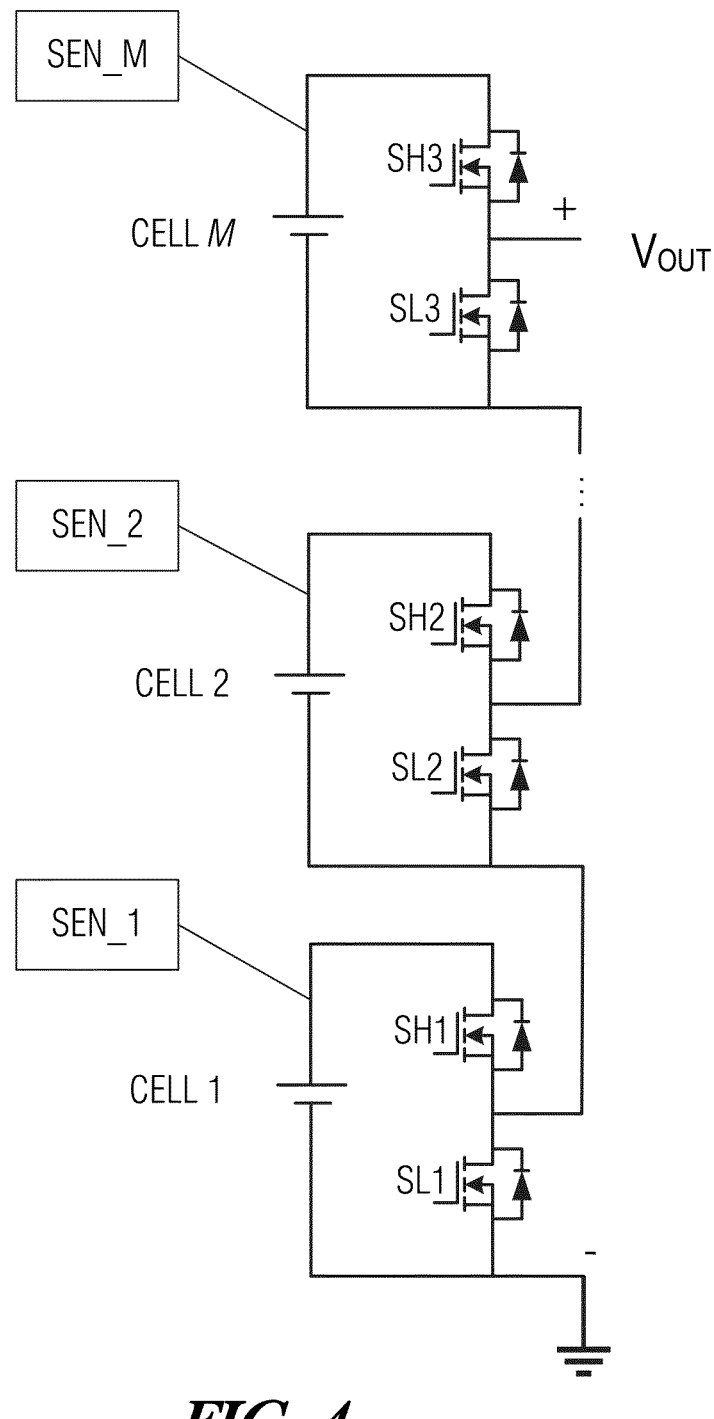
FIG. 4 is a simplified circuit diagram illustrating a portion of the multiplexing circuitry of FIG. 3 in greater detail according to one example.

FIG. 4 illustrates multiplexing circuitry according to one example in greater detail. Each battery cell is a voltage source of a half bridge, which can be connected or disconnected from the overall circuit by turning on one of the two switching devices SL, SH in response to control signaling from multiplexing controller 208. For instance, when the high side device SH is on, the battery cell is connected to the serial output voltage. The Cell is bypassed when the low side device SL is on. According to some implementations, the two switching devices SL, SH work complementarily with a deadtime. The deadtime may be provided so that both devices are off to avoid current shoot-through damaging the switching devices and potentially affecting the battery cell.

As shown in the example of FIG. 4, each multiplexing circuit switches its corresponding cell (or controllable unit) 1, 2, . . . , M (referred to generally as cell n) in and out of the overall circuit using two switches, high-side switch SHn and low-side switch SLn. For each cell n, either SHn or SLn is on at any given time. When SHn is on and SLn is off cell n is in the circuit. Alternatively, when SHn is off and SLn is on cell n is bypassed. As each switch SHn, SLn is switched to be included or omitted from the aggregated circuit, the overall output voltage Vout is varied. As the multiplexer rate changes the output frequency changes.

The multiplexing circuit includes one or more sensors SEN_1, SEN_2, . . . , SEN_M that are arranged to monitor one of more of cell voltage, cell current, and cell temperature. The monitored condition(s) measured by the sensors are provided to the multiplexing controller 208, which may collect and provide the information, or an aggregation of such information, to central BCS controller 162 (or other controller which implements the energy storage control system 108). If any cell is experiencing an over-temperature, overvoltage, or overcurrent condition, the cell may be switched out of the circuit by the controller 162, 208. In addition, the SOH of the battery cell may be assessed using such measurements. Thus, global protection for each cell is provided. For example, if a cell experiences an over-temperature condition, that cell is switched off until it cools down and can be reintroduced into the overall circuit. In various implementations, the rest period is based at least in part on the voltage, current, or temperature of the cell. Thus, impedance for a given cell is reduced and the life of the given cell is prolonged.

Accordingly, the multiplexing circuitry 155 has three main functions: switching to add or remove individually-controllable battery cells from the battery circuit, communication to send sensed measurements and receive control signaling from energy storage control system 108, and provide local protection for each cell, in similar fashion to the employment of the monitored conditions described above (which are communicated to the central BCS controller 162), but this local protection can be implemented directly in the multiplexing circuit 155 at the level of the multiplexing controller 208, without requiring communication between the higher and lower controllers.

Figure 5:
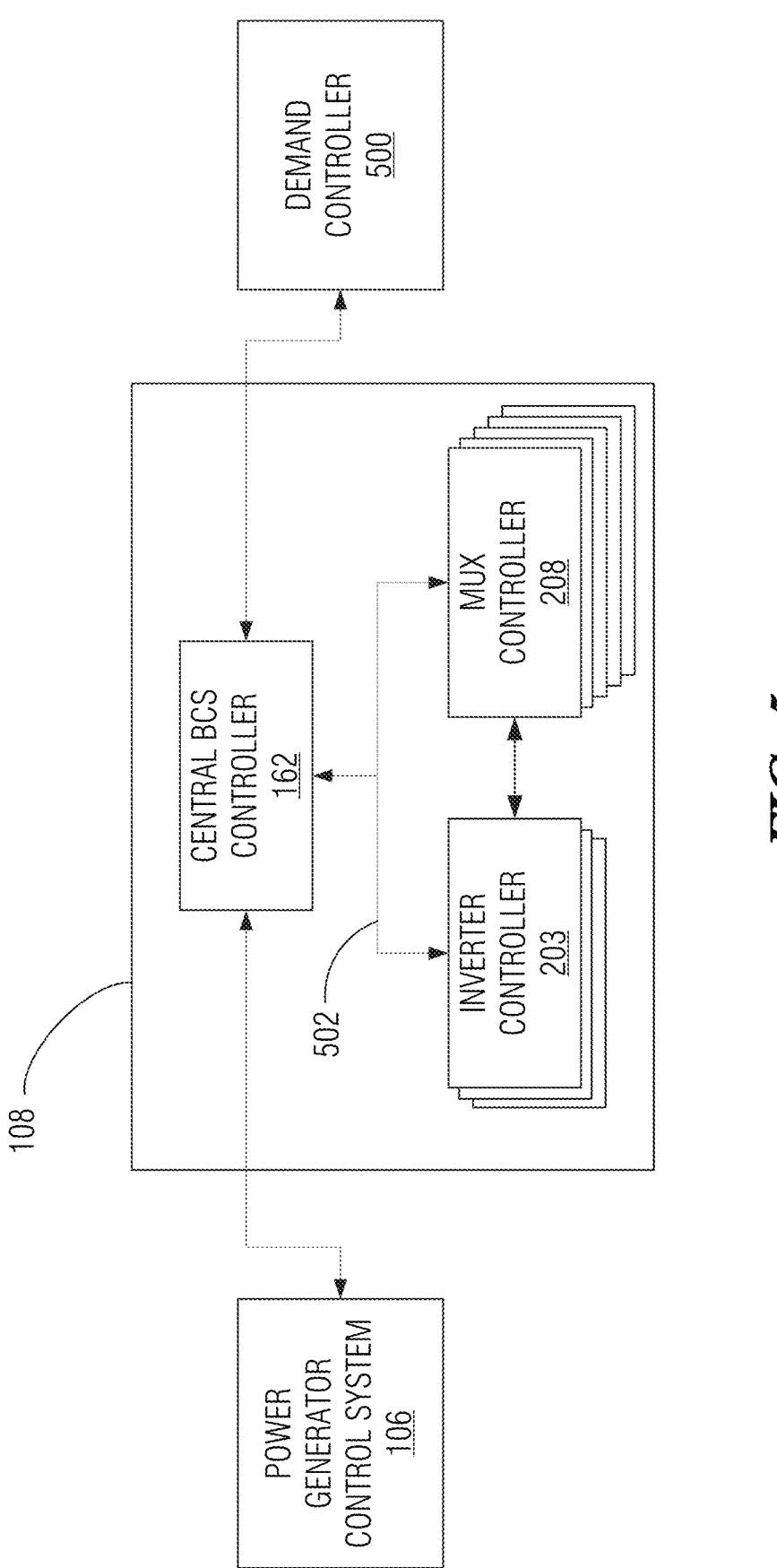
FIG. 5 is a is a block diagram depicting a controller hierarchy according to one embodiment.

FIG. 5 is a is a block diagram depicting a controller hierarchy according to one embodiment. An example of a communications arrangement is shown between central BCS controller 162, inverter controller(s) 203 corresponding to one or more inverters of the system, and multiplexing controller(s) 208 of the battery modules 155 that, collectively, constitute the energy storage control system 108. Energy storage control system 108, may communicate with power generator control system 106 demand controller 500. Demand controller 500 may be controller associated with the load, power grid, a control center, or other system that utilizes the BCS 150.

In energy storage control system 108, each multiplexing controller 208 communicates with central BCS controller 162 to receive the battery cell switching commands. In some implementations, the battery cell information, or overall battery system performance, SoC, SoH, or other power availability or capacity information (which is derived from the collective battery cell information of all of the monitored battery cells) may be provided to the demand controller 500.

The user of demand controller 500, who may be a grid operator, for example, issues commands and receives feedback from the energy storage control system 108. The central BCS controller 162 communicates with the multiplexing controller 208 and implements control algorithms to coordinate the operation of multiplexing circuits 204. Likewise, central BCS controller 162 communicates with inverter controller 203 and controls the operation of inverter 202.

According to one type of implementation, the central BCS controller 162 communicates with multiplexing controllers 208 via one or more communications interface(s) 502, such as FLEXRAY, I²C, universal serial bus (USB), an interface according to any of the IEEE 1394-family standards, an IEEE 802.3 (Ethernet) local area network, Fibre Channel (FC), a wireless network interface in accordance with a standard of the IEEE 802.11-family (WiFi) or the IEEE 802.15-family (WPAN/Bluetooth), or any other suitable communication method. Communications between central BCS controller 162 and power generator control system 106, or demand controller 500, may be via suitable interface, such as Ethernet, wide-area network (WAN), an Internet-Protocol (IP) network, or other suitable communications interface.

Figure 6:
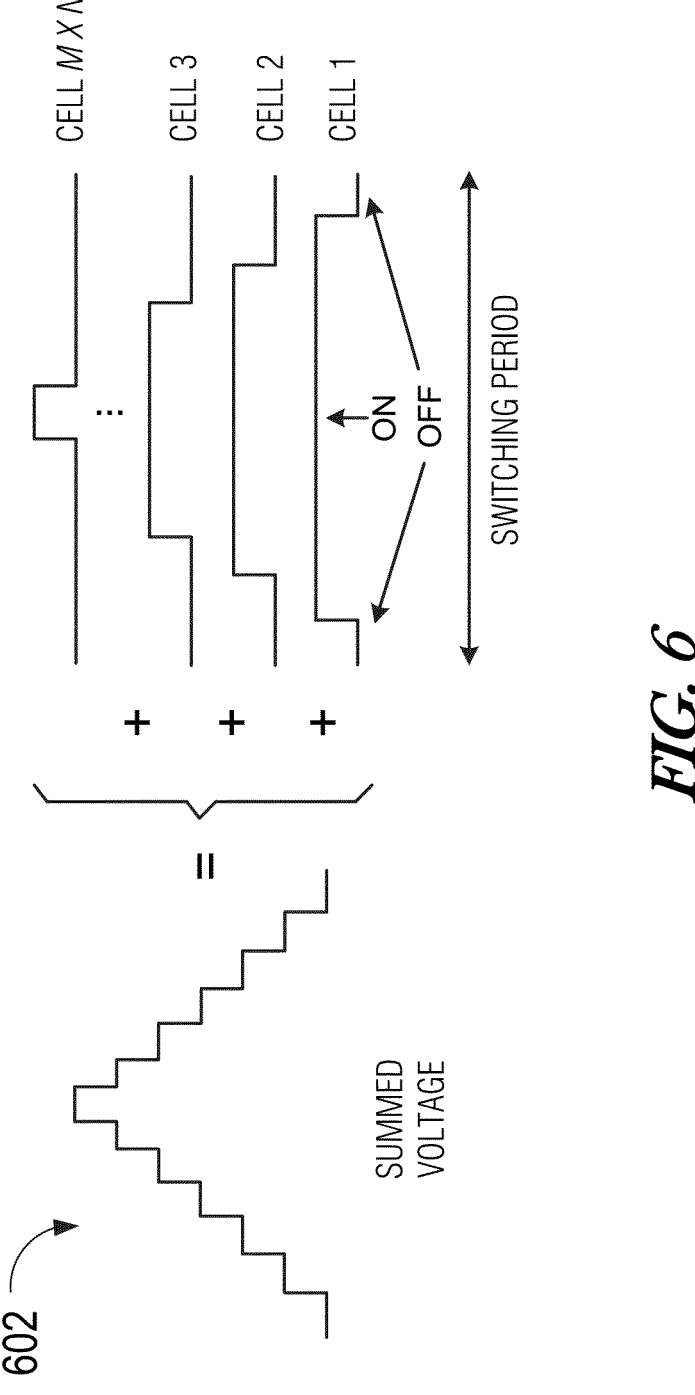
FIG. 6 is a diagram illustrating individual battery cells being switched into and out of the battery circuit according to an operational example of the BCS of FIG. 1B in which an aggregated voltage of the battery circuit has a periodic waveform.

FIG. 6 is a diagram illustrating controllable voltage variability of the BCS that is achievable by switching of individual battery cells into and out of the battery circuit according to an operational example. The voltages of the individual battery cells (or controllable units) are summed by the series connection of the multiplexing circuits 204. Utilizing timed switching, the individual battery cells or controllable units, CELL 1, CELL 2, CELL 3, . . . , CELL M×N are either activated or bypassed at different times and for various durations to set or adjust a specific DC voltage or create a specific waveform. In this example, the illustrated waveform as indicated at 602 is a voltage waveform that resembles a triangular wave. In related embodiments, the voltage waveform is shaped in this manner to resemble a sinusoidal waveform, a square waveform, or other shape.

Figure 7:
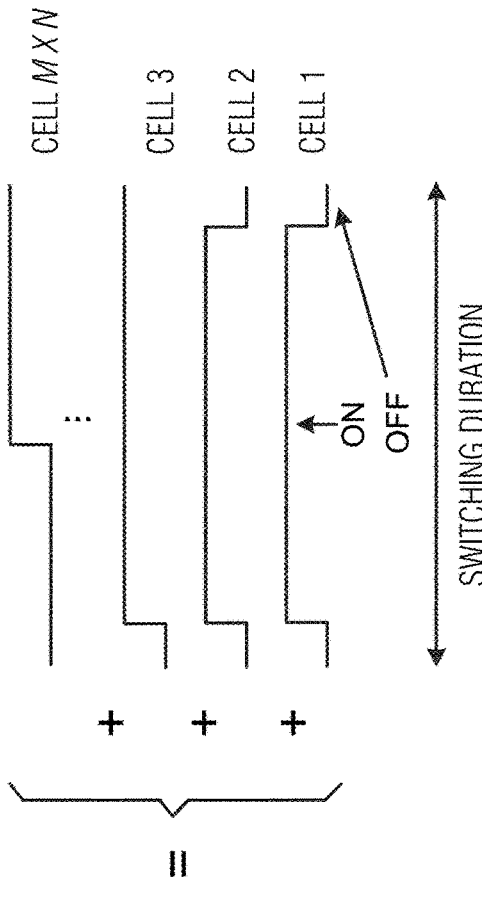
FIG. 7 is a related diagram illustrating individual battery cells being switched into and out of the battery circuit according to an operational example in which an aggregated voltage of the battery circuit is a time-varying DC voltage.
Figure 7:
Figure 7:
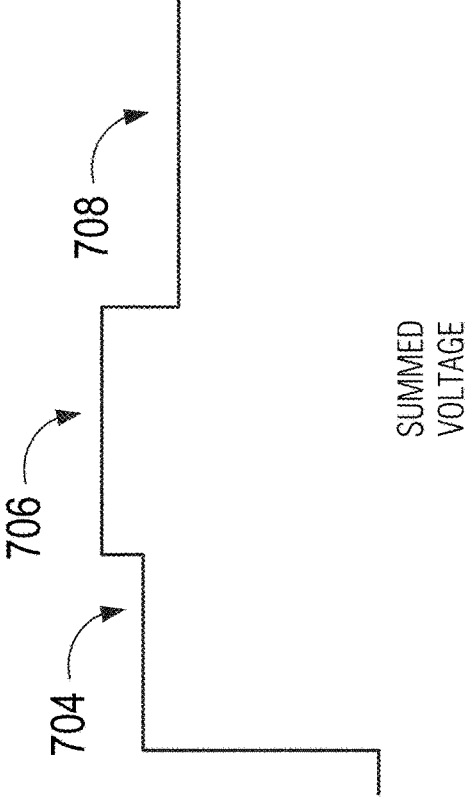

In a related embodiment, the battery cells CELL 1, CELL 2, CELL 3, . . . , CELL M×N may be switched to generate a time-varying DC voltage. FIG. 7 is a diagram illustrating an example of such a time-varying DC voltage. In this example, a group of battery cells are switched on to produce a first DC voltage 704. For each battery module 155, the DC voltage may be adjusted by multiplexing controller 208 as called for by central BCS controller 162. For instance, additional cell(s) may be activated to produce a greater DC voltage 706. Subsequently, some activated cells may be bypassed to reduce the DC voltage to voltage 708. This example demonstrates that activation of the battery cells is not necessarily in accordance with a predefined waveform having a periodicity. Rather, a DC voltage may be maintained as a steady state, or it may be adjusted as called for by the operating regime of the BCS implemented by the controller.

Converter-Free Power Systems

In various use cases, the variable voltage output of a BCS may be utilized in power circuits calling for such variable voltage, in place of a dedicated power-converter circuit.

Figure 8:
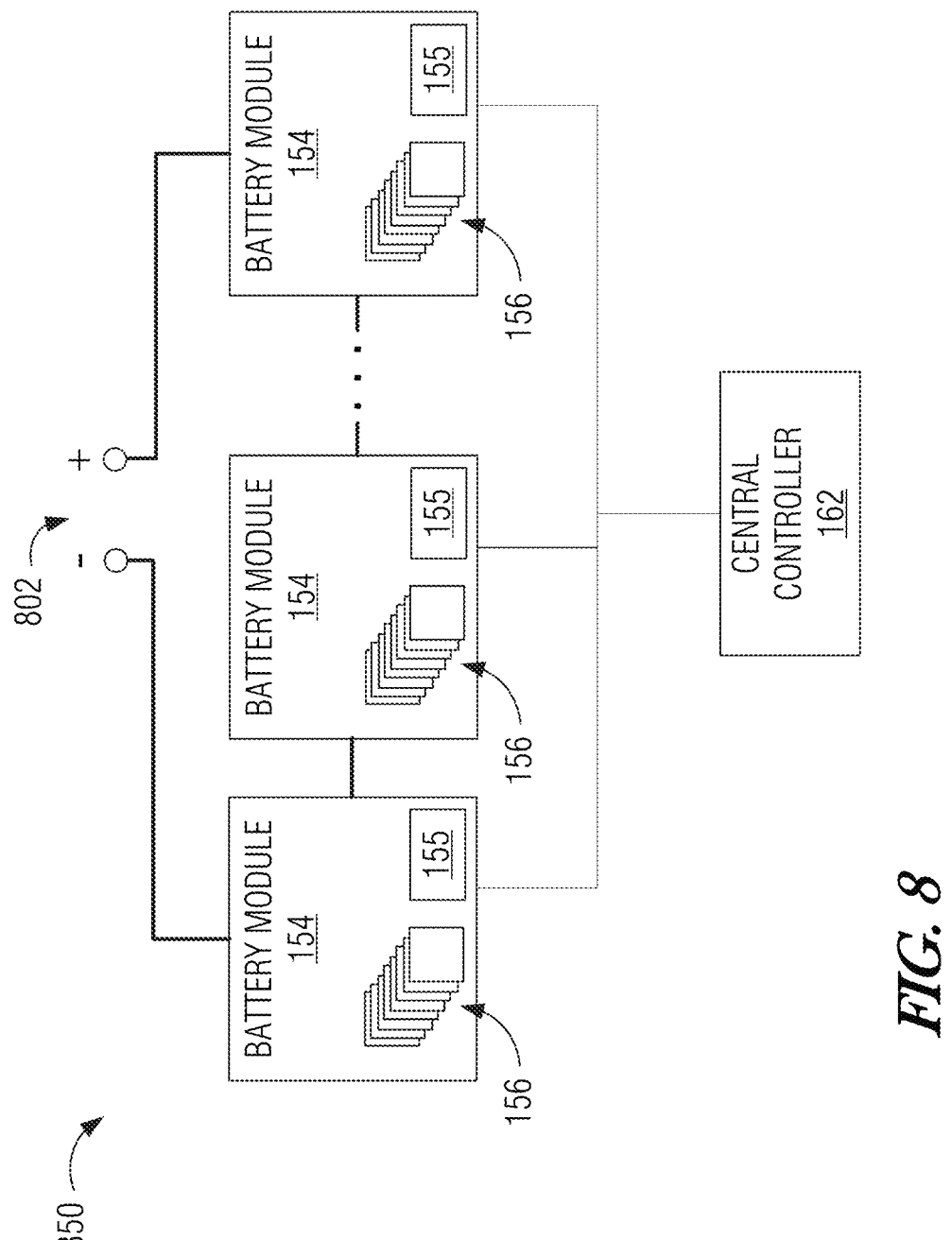
FIG. 8 is a block diagram illustrating a BCS which may be used in variable-DC-power applications according to various embodiments.

FIG. 8 is a block diagram illustrating a BCS 850 which may be used in variable-DC-power applications according to various embodiments. BCS 850 is similar to BCS 150 described above with reference to FIG. 1B, except that the power input and output of BCS 850 is accessible via battery system terminals 802. In some embodiments, the inverter circuitry may be omitted as part of the BCS 850.

Figure 9:
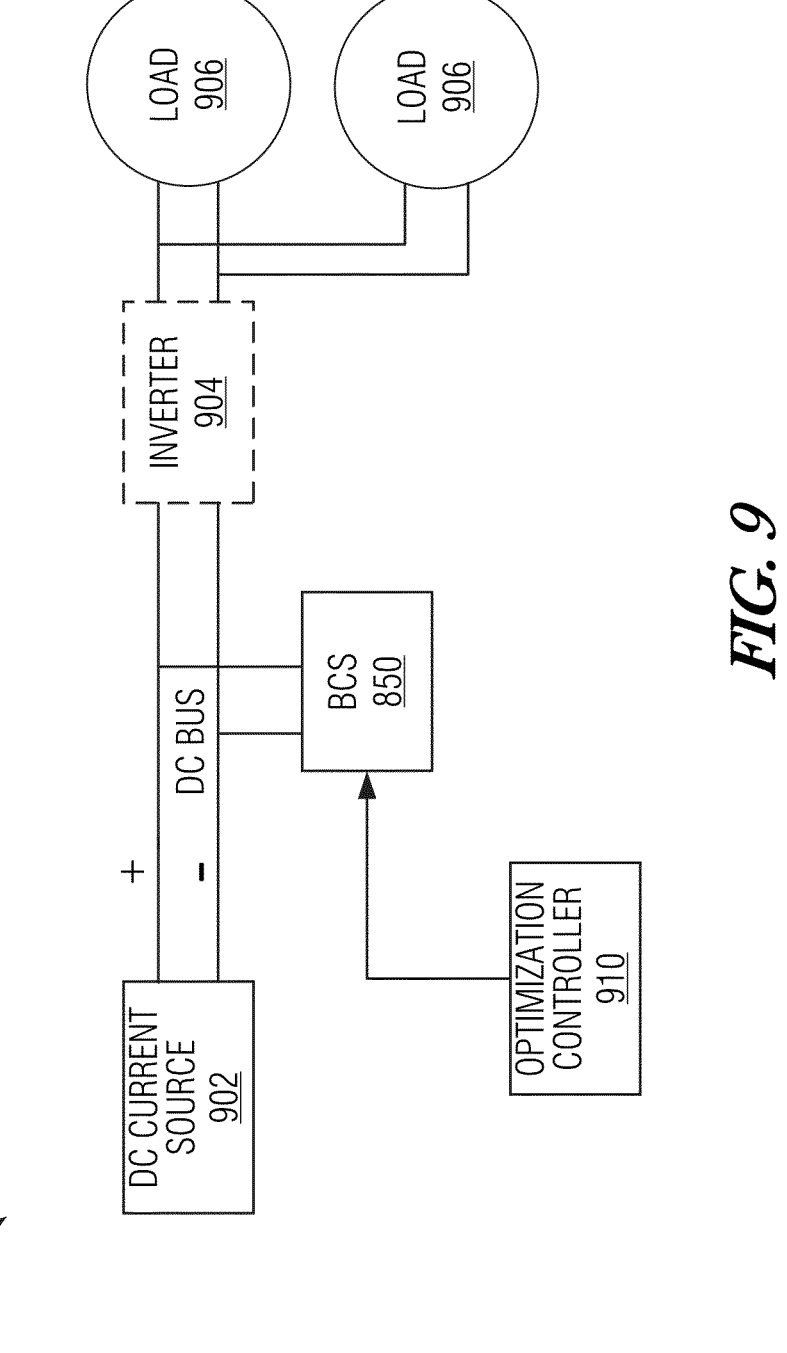
FIG. 9 is a block diagram illustrating an application of the BCS of FIG. 8, according to some examples.

FIG. 9 is a block diagram illustrating an application of BCS 850 according to some examples. As depicted, power system 900 includes a DC current source 902, an optional inverter 904 (if required to supply power to load(s) 906), and optimization controller 910. Load(s) 906 may be an AC power grid, or AC appliance, in which case inverter 904 is provided. In some implementations, load 906 is a DC load, such as a DC appliance, motor drive, or DC power bus which does not require AC power; in such cases, inverter 904 is omitted.

DC current source 902 may be a PV or a TPV system, a fuel cell system, or other current source. BCS 850 is connected in parallel with DC current source 902. Inverter 904 may be an inverter circuit such as inverter 152 as described above.

Optimization controller 910 may be a MPPT controller that monitors parameters of the DC current source 902 and its operational and environmental conditions, and assesses the maximum power point for the DC current source 902. Optimization controller 910 provides a voltage setpoint, or other control signaling (e.g., increase/decrease voltage), to BCS 850 in order to cause BCS 850 to vary the overall load as seen by DC current source 902. Optimization controller 910 may be implemented as a component of the DC current source according to one type of embodiment. In another embodiment, optimization controller 910 is implemented with central BCS controller 162 (FIG. 1B, FIG. 5), in which case central BCS controller 162 is provided suitable inputs of sensed conditions and operational parameters of the DC current source from which to execute an optimization algorithm. As an example of an optimization objective, the PV system may be operated at its maximum power point for the presently-prevailing condition. However, the load demands most often do not correspond to the MPP.

Accordingly, in one embodiment, BCS 850, which is connected across the output of the DC current source 902 (in this example, a PV system), is controlled to dynamically adjust its battery voltage to be at a level that causes the PV system to operate at its MPP. Such control is achieved by optimization controller 910 dynamically commanding BCS 850 to adjust its voltage in accordance with the MPPT algorithm.

Figure 10:
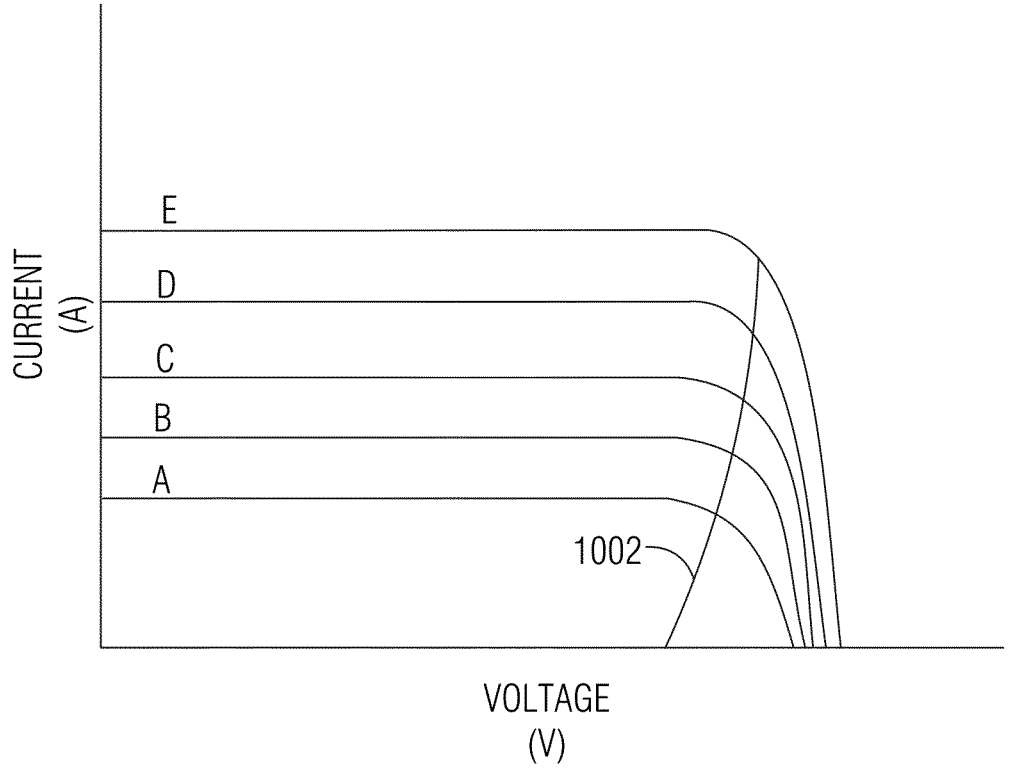
FIG. 10 is a graph illustrating an example of MPPT set points based on characteristic power output from a PV system according to one type of embodiment.

FIG. 10 is a graph illustrating an example of MPPT set points based on characteristic power output from a PV system according to one type of embodiment. Control to achieve the MPPT may be implemented by optimization controller 910. The graph shows a set of I-V curves, labeled A-E, for various levels of captured light by the PV system. Curve 1002 represents the maximum power point (MPP) for the various operating points to be achieved by optimization controller 910 commanding BCS 850. When BCS 850 is controlled in this manner, it dynamically compensates the difference between the output of the PV system, and the power demands of the load.

According to a basic operating regime in one example, when the available power output of the DC current source 902 is higher than the power demand of load 906, the excessive power is charged to the battery cells of BCS 850 at a power level to cause DC current source 902 to operate at its MPP. When the available power of the DC current source 902 is lower than the load's power demand, the required extra power is delivered to the load by discharging battery cells of the BCS 850 at a rate that allows DC current source 902 to operate at its MPP. Furthermore, when the MPP of the DC current source 902 is higher than the load's power demand and the battery cells of BCS 850 are fully charged, BCS 850 controls its output voltage to curtail PV power since the fully-charged battery cells cannot accept any more energy.

Advantageously, the BCS 850 responds instantly when there is a rapid change in the available power from DC current source 902, or a rapid change of the load demand. In addition, the same battery cells that work as backup batteries to replace or supplement the DC current source 902 are the battery cells which are used to facilitate the MPPT functionality as described herein. Moreover, in embodiments that require the inverter 904, the variable-voltage BCS 850 may work to ensure that the inverter receives power at a voltage level that is within the inverter's optimal range for greatest efficiency. In addition, the voltage variability and controllability of BCS 850 permits the power system 900 to be free of a DC-DC converter.

Grid-Tied PV Embodiments

In a grid-tie PV system, multiple operational regimes may be applicable according to some aspects of the invention. The appropriate operational regime may be adopted in response to current the grid power demand policy in force by the grid operator. In particular, the grid operator may permit a flexible grid power demand that allows the energy storage system to determine the amount of power that it may provide to the grid. Separately, the grid operator may impose a fixed power demand e.g., in accordance with utility scheduling.

According to a first example operational regime applicable for flexible grid power demand situations, the BCS 850 controls its voltage output, $V_{DC}$, to achieve the MPP of the PV system, i.e., $P_{PV}=P_{PVmax}$. In addition, a time of use (ToU) pricing strategy may be employed to maximize revenue: if the electricity price is low, import power from the grid to charge the battery cells, i.e., charge the battery cells at their maximum charging power, $P_{Bmax}=P_G+P_{PV}$ (where $P_G$ is the power supplied from the grid and $P_{PV}$ is the power supplied from the PV system; and if the price of electricity is high, the maximum available power is fed to the grid, i.e., $P_G=P_{Bmax}+P_{PV}$.

According to a second operational regime, which is applicable to a fixed-power-demand situation, as the power to the grid, $P_G$ is fixed, The power produced by the PV system, $P_{PV}$, should be reduced to avoid charging battery cells with higher than its maximum charging power $P_{Bmax}$. This is accomplished by the BCS controlling the PV system's output voltage to be either higher or lower than its MPP.

Figure 11:
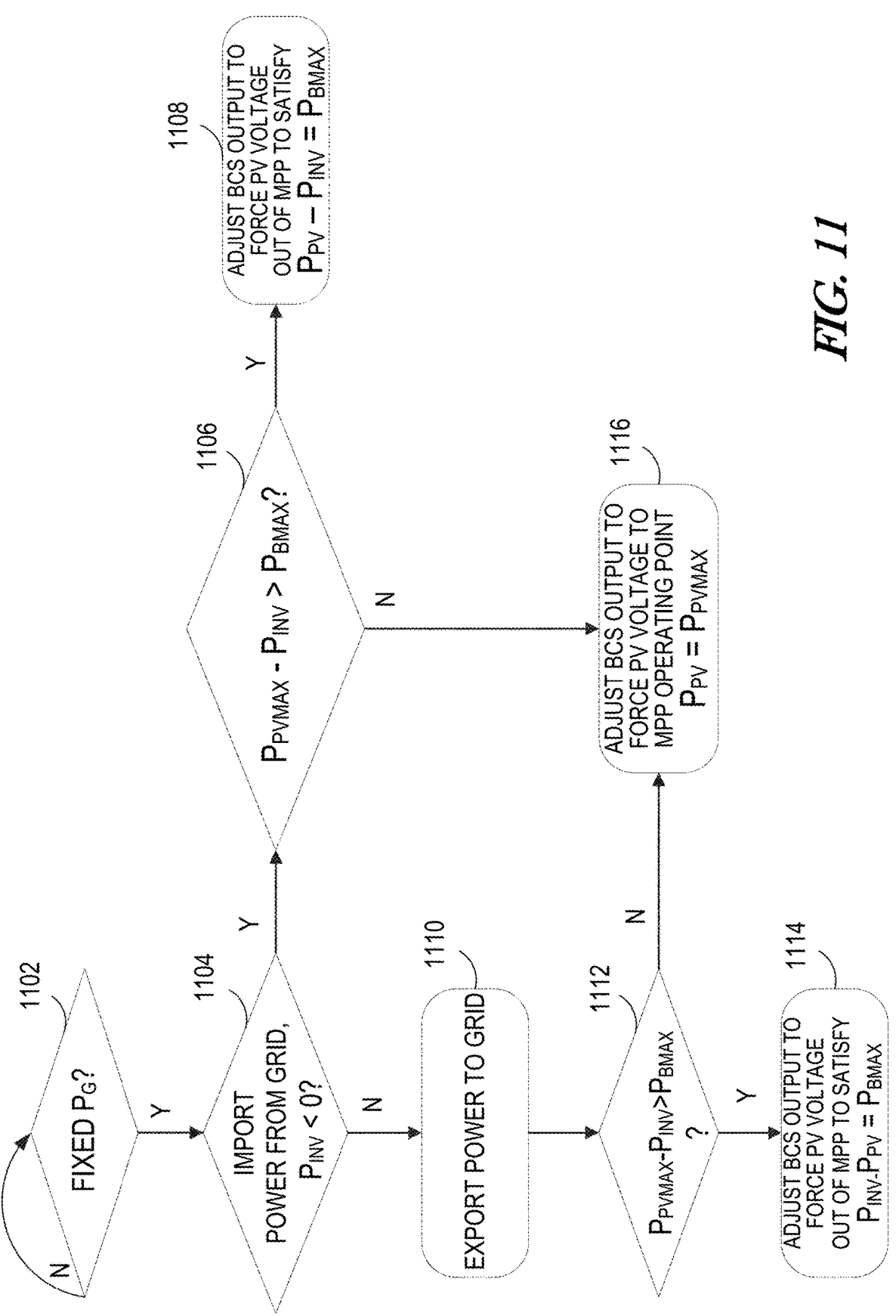
FIG. 11 is a flow diagram illustrating an example algorithm as implemented on a controller of a BCS to selectively utilize the BCS to either control a MPP of a DC power generator, or retard the power output of the power generator, according to an example embodiment.

FIG. 11 is a flow diagram illustrating one such algorithm, to be executed by central controller 162 of BCS 850 according to an example embodiment. At 1102, a determination is made whether the grid operator has imposed a fixed power demand policy. In the affirmative case, a determination is made as to whether power should be imported from the grid, expressed as whether the power input to the inverter 904, which converts power to be supplied to the grid, $P_{INV}$, is a negative value. If such is the case, it means that power may be exported to the grid.

Hence, the process advances to decision 1106, which determines whether there is excess generated power, defined as the difference between the maximum power supplied by the PV system (as DC current source 902), $P_{PVmax}$, and the power input to the inverter 904, $P_{INV}$, being greater than the maximum charging power of the battery cells of the BCS 850, $P_{Bmax}$. In the affirmative case, it means that BCS 850 is unable to absorb the excess power if the PV system is achieving its maximum power point. Hence, the process advances to 1108, where the BCS output voltage is adjusted to force the PV voltage to satisfy the equation $P_{PV}-P_{INV}=P_{Bmax}$ even if satisfying this condition means that the PV system is operated outside of its MPP. If there is no excess generated power as determined at decision 1106, the process branches to 1116, which adjusts the output of BCS 850 to force the PV voltage corresponding to its MPP operating point, $P_{PV}=P_{PVmax}$.

If decision 1104 is negative, it means that power is to be exported to the grid at 1110. Accordingly, decision 1112 assesses whether there is a possibility that excess power can be produced by the PV system defined as the difference between the maximum power that can be generated by the PV system (if operated at its MPP), $P_{PVmax}$, and the present power demand at the input to the inverter 904, $P_{INV}$, (to achieve the fixed power to the grid $P_G$), which is greater than the highest charging power output that the BPS 850 can use to absorb the excess power, $P_{Bmax}$. In the affirmative case, the process branches to 1114, where the BCS output is adjusted to force the PV voltage out of its MPP state to satisfy the equation $P_{PV}-P_{INV}=P_{Bmax}$.

If, on the other hand, decision 112 is negative, meaning that there is no possible excess power generated by the PV system, the process branches to 1116 to operate the BCS as a MPPT control.

Notably, in the process of FIG. 11, the BCS 850 may be operated in a way that deliberately limits the power output of the PV system in order to accommodate limitations of the BCS.

Scheduled BCS Depletion

Referring again to FIG. 9, in a related aspect, optimization controller 910 operates BCS 850 in order to present a defined load for DC current source 902 at certain times when the power produced by DC current source 902 is expected to exceed the demands of load(s) 906. This approach may be particularly applicable to PV power sources which are expected to generate excess power relative to the demand expectation for load(s) 906. In some circumstances, it is desirable to draw the excess power away from the PV cells in order to reduce internal heating in the PV cells, which over time can degrade the PV cells.

Accordingly, in one type of embodiment, using a predicted load demand schedule, optimization controller 910 operates BCS 850 such that a significant portion of the battery cells of BCS 850 are substantially depleted in advance of times when high levels of excess power in the PV cells are expected. At the times of high excess power in the PV cells, BCS 850 is operated to sink power from the PV cells while putting that excess power to beneficial use of charging the battery cells of BCS 850.

This scheduled BCS depletion regime of operating BCS 850 differs somewhat from more conventional use cases where BCS 850 would be used mainly to supplement the PV power source in order to meet high load demands. Although the scheduled BCS depletion regime is certainly useful to supplement the PV power source to meet peak load demand, a primary emphasis of the scheduled BCS depletion regime is to deplete BCS 850 at certain times.

This regime may result in preferential utilization of power from BCS 850 even when sufficient power is otherwise available from the PV power source to meet load demand. Although such operation may create an excess-power situation for the PV power supply, resulting in greater power dissipation in the PV cells than in the absence of the power supplied from BCS 850, BCS 850 may be selectively operated to regulate the excess power in the PV cells to an acceptable degree (within a predefined acceptable range). The regulation of excess power in the PV cells using BCS
850 may be dynamically varied based on present conditions,
such as ambient temperature, or age or other condition of the
PV cells.

Fuel Cell-Powered Embodiments

Figure 12:
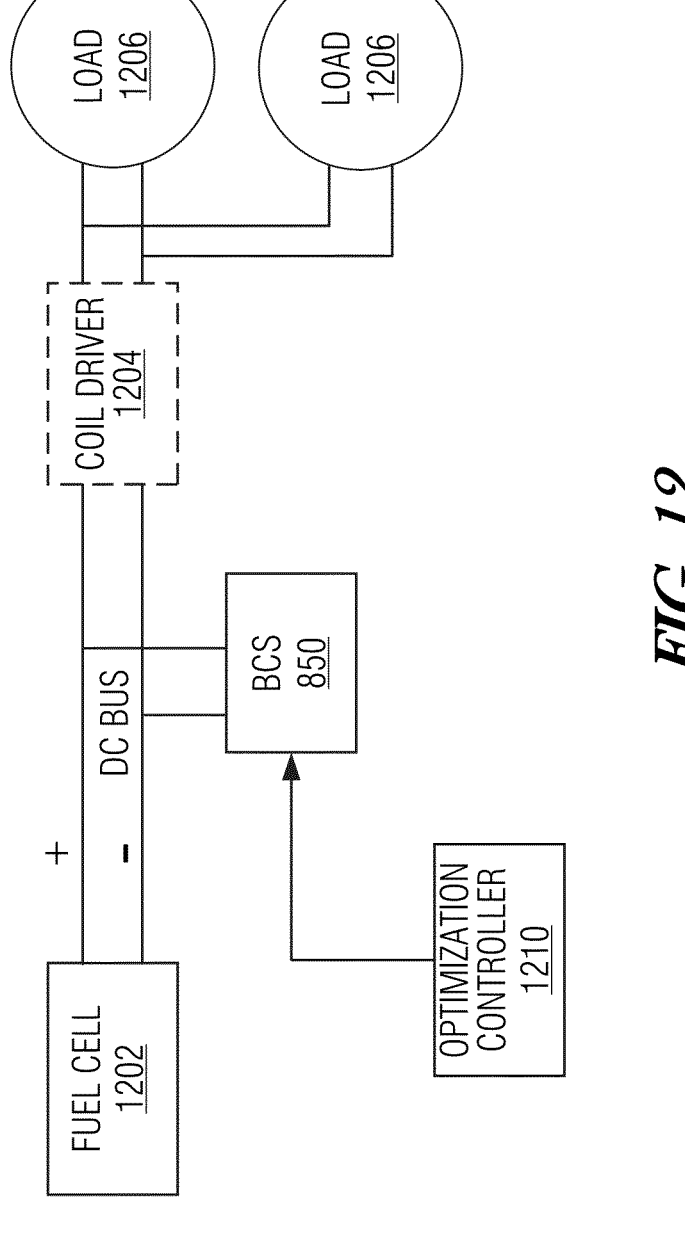
FIG. 12 is a block diagram illustrating an example fuel-cell-powered system which may be implemented in an electric vehicle, industrial machine, or myriad other applications.

FIG. 12 is a block diagram illustrating an example fuel-
cell-powered system 1200, which may be implemented in an
electric vehicle, industrial machine, or myriad other appli-
cations. System 1200 includes fuel cell 1202 as a DC power
source. A BCS 850, which is structured as described above,
is provided along with optimization controller 1210. Load(s)
1206 can receive power from fuel cell 1202 in combination
with BCS 850. Load(s) 1206 may be electric motor(s), such
as one or more traction motors of an electric vehicle, or other
consumer of power. In motorized applications, coil driver
1204 may be provided. Coil driver 1204 may be a variable-
frequency drive, for example.

Notably, fuel cell 1202 achieves its MPP at a certain
voltage, and may need to dedicate a certain amount of power
to support systems, such as cooling systems for the fuel cell
itself. In addition, by their nature, fuel cells are not well-
suited to dynamically varying their power output to respond
to sudden changes in power demand, complicating their use
in such applications as electric vehicles, in which the power
demand is highly variable.

Accordingly, in some embodiments, the use of BCS 850
facilitates a dual role of setting the output voltage at the MPP
of fuel cell 1202, under the control of optimization controller
1210, and also providing highly dynamic power output,
supporting practically instantaneous changes, to meet the
load's demands. The voltage variability provided by BCS
850 can obviate the necessity of a DC-DC converter at the
output of fuel cell 1202, advantageously avoiding the
expense and complexity of such circuitry.

Optimization controller 1210 is arranged similarly to
optimization controller 910 described above, except that
optimization controller 1210 is specifically configured to
optimize the operation of BCS 850 to support fuel cell 1202.
In a particular example, optimization controller 1210 may be
configured with MPP data for the specific type of fuel cell
1202, which may be a function of fuel cell temperature,
present loading state, aging of the fuel cell, and other
relevant factors. In a related example, optimization control-
ler 1210 may be configured with fuel-cell efficiency data that
represents fuel consumption rates at the various conditions.
In some embodiments, optimization controller 1210 may
operate BCS 850 in a first regime which performs MPPT, or
in a second regime which aims to optimize fuel consump-
tion.

Optimization Controller

Figure 13:
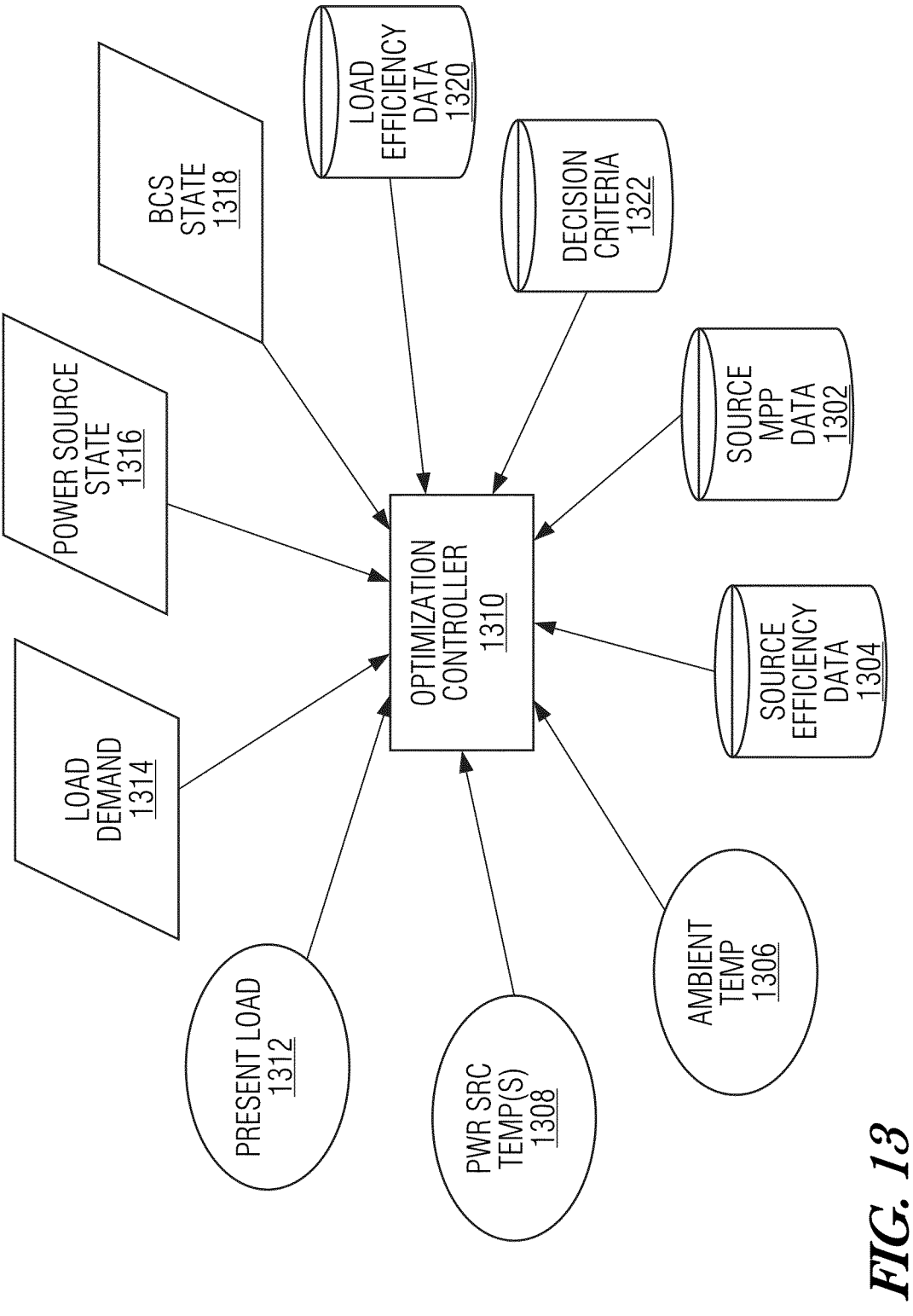
FIG. 13 is a block diagram illustrating an example arrangement of inputs to an optimization controller according to some embodiments.

FIG. 13 is a block diagram illustrating an example
arrangement of inputs to an optimization controller accord-
ing to some embodiments. Optimization controller 1310 is
analogous to optimization controller 910 (FIG. 9) and opti-
mization controller 1210 (FIG. 12). The various inputs
include, as depicted, source MPP data 1302, which includes
the MPP of the power source (e.g., PV system, fuel cell) and
the associated MPP, which may be a function of one or more
conditions, such as temperature, loading, aging or mainte-
nance state of the power source, etc. Similarly, source
efficiency data 1304 includes operating point information of
the power source for the various operating conditions, which
produce the maximum operating efficiency. The efficiency
data is relevant for fuel cell-based systems that consume a
fuel source.

Optimization controller 1310 also receives a number of
sensory inputs, including ambient temperature 1306, and power source temperature 1308, which may include tem-
perature measurements of different portions of the power
source (e.g., temperature sampled at different PV cells or at
different cells of a fuel cell system. In addition, optimization
controller 1310 may receive a measurement of the present
loading condition 1312, which may include the voltage and
current instantaneously being supplied to the load from the
power source and the BCS 850.

Furthermore, optimization controller 1310 may receive
dynamic data, such as load demand 1314, which may be
provided by demand controller 500 (FIG. 5), and which may
include present load demand and predicted load demand for
the future (e.g., next 24, 48, 72 hours). Optimization con-
troller 1310 may further receive power source state 1316,
which may be provided by power generator control system
106 (FIG. 1A), and may include such information as the
instantaneous power supplied by the power source, and
information about the state of health of the power source
based on its age and operational history, for instance. BCS
state 1318 is another type of dynamic data received by
optimization controller 1310 of the example depicted. BCS
state 1318 represents the overall charge state of the BCS
850, which indicates the energy available from BCS 850,
and is informative of the need to charge BCS 850. BCS state
1318 may be provided by central BCS controller 162 (FIG.
1B).

In some embodiments, optimization controller 1310
receives load efficiency data 1320. Load efficiency data 1320
represents optimal supply power characteristics for maxi-
mum operational efficiency of the load, or of the interface
circuitry which supplies the load, such as voltage-regulation
or inverter circuitry. As an example, load efficiency data
1320 may include an indication of an optimal voltage, or
range of voltages, at which the load or interface circuitry
operates with greatest efficiency.

Optimization controller 1310 processes the various inputs
based on decision criteria 1322. Decision criteria 1322
defines the preferred operating mode of BCS 850 based on
the various inputs described above. As discussed above,
BCS 850 may be operated in a discharging regime, i.e.,
sourcing power to the load in conjunction with, or in lieu of,
the power source 902, or a charging regime to sink power
from the power source. Application of decision criteria 1320
by operation of optimization controller 1310 determines the
functional objective for BCS 850, such as whether BCS 850
should be operated to supply power to help the power source
meet the loading demand, or whether the power source
should be operated according to a MPPT mode, efficiency-
maximization of the power source, or efficiency-maximiza-
tion of the load or interface circuitry. For the selected
operational objective, decision criteria 1322 may define the
operating regime (i.e., sourcing/sinking power, BCS volt-
age) to be used by BCS 850 to achieve that objective.
Moreover, application of decision criteria 1322 may deter-
mine, within each operating regime, the amount of output or
input power (i.e., BCS voltage) to set for BCS 850 in order
to achieve the functional objective.

FIG. 14 is a flowchart illustrating an example method for
operating a DC power system that includes a DC source, and
a series arrangement of a plurality of switched controllable
units of one or more battery cells, wherein each controllable
unit is switchably bypassable according to a control signal,
and an input/output interface that couples the series arrange-
ment to a load. At 1410, the DC power system selectively
sources and sinks power so as to variably control a voltage
at the input/output interface utilizing the plurality of
switched controllable units. At 1420 the DC power system sources power from the plurality of switched controllable units to supply power to the load in addition to, or in lieu of, the DC source. At 1430, the DC power system regulates electrical performance of the external circuit by dynamically varying the voltage at the input/output interface.

The external circuit may be the DC source in some configurations. In other configurations, the external circuit may be the load. In related embodiments, the DC power system assesses a power demand of the load, a power capacity of the DC current source, and a present capacity of the plurality of controllable units to absorb excess power of the DC current source which exceeds the power demand of the load. The DC power system causes the plurality of switched controllable units to implement an MPPT control in response to an assessment that the plurality of controllable units have capacity to absorb the excess power of the DC current source, and further causes the plurality of switched controllable units to forgo the MPPT control in response to an assessment that the plurality of controllable units do not have capacity to absorb the excess power of the DC current source.

De-Rating of BCS

In related embodiments, DC source power fed to the BCS 850 (for charging the battery cells of the BCS 850), or BCS power delivered to the load, is throttled based on a de-rating of the active cells of the BCS 850. In some examples, the SOC, temperature, or other state indicator of the battery cells which are active is known by the controller of the BCS 850. Based on this information, the BCS 850 may apply de-rating criteria to limit the amount of power that is supplied to, or sourced from, the BCS 850. The de-rating, advantageously, can reduce heating of the battery cells of the BCS 850, which over time can extend the useful life of those battery cells.

In one example, the de-rating criteria may be applied based on certain SOC thresholds. For instance, de-rating may be applied when measured SOC is above 90% or below 10%. The de-rating criteria may use cell-specific SOC measures, or a single SOC measure may be aggregated for the currently-active battery cells. In the former case, the highest (or lowest) SOC value from among the active battery cells in the BCS 850 may be used as a representative SOC value for the BCS 850. In the latter case, a statistical aggregation, such as an average SOC value, is computed for the active battery cells of the BCS 850, and this aggregated value is used to determine the de-rating. The de-rating may be computed as a function of SOC, which may be linear or non-linear.

In other embodiments, the de-rating criteria may be based on the measured temperature of the battery cells of the BCS. The temperature measurement for de-rating determination may be indicated as an absolute temperature value, or as a temperature rise over ambient temperature. Certain temperature thresholds may be defined for the controller of BCS 850 to apply the de-rating function.

ADDITIONAL NOTES AND EXAMPLES

Example 1 is a DC power system comprising: a first interface to a DC source; a second interface electrically coupled to the first interface and to a load; a battery control system (BCS) having an input/output interface electrically coupled to the first interface and to the second interface; the BCS comprising a series arrangement of a plurality of switched controllable units of one or more battery cells, wherein each controllable unit is switchably bypassable according to a control signal; the BCS operative to selectively source and sink power so as to variably control a voltage at the input/output interface utilizing the plurality of switched controllable units under control of a BCS processor that produces the control signal; the BCS processor operative to source power from the plurality of switched controllable units to supply power to the load in addition to, or in lieu of, the DC source; and the BCS processor operative to regulate electrical performance of an external circuit electrically coupled to the input/output interface by dynamic variation of the voltage at the input/output interface according to the control signal.

In Example 2, the subject matter of Example 1 includes, wherein the external circuit is the DC source, and wherein the BCS processor is operative to implement maximum power point tracking (MPPT) control of the DC source by the dynamic variation of the voltage at the input/output interface according to the control signal.

In Example 3, the subject matter of Examples 1-2 includes, wherein the external circuit is the DC source, and wherein the BCS processor is operative to implement an efficiency program that matches the voltage at the input/output interface with a voltage range corresponding to a predefined operating point of the DC source according to the control signal.

In Example 4, the subject matter of Example 1 includes, wherein the external circuit is the load, and wherein the BCS processor is operative to implement an efficiency program that matches the voltage at the input/output interface with a voltage range corresponding to a predefined operating point of the load according to the control signal.

In Example 5, the subject matter of Examples 1 or 4 includes, wherein the external circuit is a power-converter circuit, and wherein the BCS processor is operative to implement an efficiency program that matches the voltage at the input/output interface with a voltage range corresponding to a predefined operating point of the power-converter circuit according to the control signal.

In Example 6, the subject matter of Examples 1-5 includes, wherein: the BCS processor is operative to assess a power demand of the load, a power capacity of the DC current source, and a present capacity of the plurality of controllable units to absorb excess power of the DC current source which exceeds the power demand of the load; the BCS processor is operative to cause the plurality of switched controllable units to implement MPPT control in response to an assessment that the plurality of controllable units have capacity to absorb the excess power of the DC current source; and the BCS processor is operative to cause the plurality of switched controllable units to forgo the MPPT control in response to an assessment that the plurality of controllable units do not have capacity to absorb the excess power of the DC current source.

In Example 7, the subject matter of Examples 1-6 includes, wherein the load comprises an electrical grid which includes a power generator.

In Example 8, the subject matter of Examples 1-7 includes, wherein the load comprises an electrical motor which is also a power generator.

In Example 9, the subject matter of Examples 1-8 includes, wherein the load comprises a DC load.

In Example 10, the subject matter of Examples 1-9 includes, wherein the DC current source comprises a photovoltaic (PV) system.

In Example 11, the subject matter of Examples 1-10 includes, wherein the DC current source comprises a fuel cell (FC) system.

In Example 12, the subject matter of Examples 1-11 includes, wherein the second interface comprises an inverter circuit.

In Example 13, the subject matter of Examples 1-12 includes, wherein the BCS processor includes an optimization controller that reads inputs including: a plurality of sensory inputs including present loading and present temperature information; present-state information including present load demand, power source state, and BCS state; and performance-optimization information including source efficiency data, load efficiency data, and source maximum-power-point data; and wherein the optimization controller is operative to generate the control signal to effect the dynamic variation of the voltage at the input/output interface based on the read inputs.

Example 14 is a method for operating a DC power system that includes, a DC source, and a series arrangement of a plurality of switched controllable units of one or more battery cells, wherein each controllable unit is switchably bypassable according to a control signal, and an input/output interface that couples the series arrangement to a load, the method comprising: by the DC power system, selectively sourcing and sinking power so as to variably control a voltage at the input/output interface utilizing the plurality of switched controllable units; sourcing power, by the DC power system, from the plurality of switched controllable units to supply power to the load in addition to, or in lieu of, the DC source; and regulating, by the DC power system, electrical performance of an external circuit by dynamically varying the voltage at the input/output interface.

In Example 15, the subject matter of Example 14 includes, wherein the external circuit is the DC source, and further comprising implementing, by the DC power system, maximum power point tracking (MPPT) control of the DC source by the dynamically varying the voltage at the input/output interface.

In Example 16, the subject matter of Examples 14-15 includes, wherein the external circuit is the DC source, and further comprising implementing, by the DC power system, an efficiency program that matches the voltage at the input/output interface with a voltage range corresponding to a predefined operating point of the DC source.

In Example 17, the subject matter of Example 14 includes, wherein the external circuit is the load, and further comprising implementing, by the DC power system, an efficiency program that matches the voltage at the input/output interface with a voltage range corresponding to a predefined operating point of the load.

In Example 18, the subject matter of Examples 14 or 17 includes, wherein the external circuit is a power-converter circuit, and further comprising implementing, by the DC power system, an efficiency program that matches the voltage at the input/output interface with a voltage range corresponding to a predefined operating point of the power-converter circuit.

In Example 19, the subject matter of Examples 14-18 includes, assessing, by the DC power system, a power demand of the load, a power capacity of the DC current source, and a present capacity of the plurality of controllable units to absorb excess power of the DC current source which exceeds the power demand of the load; causing, by the DC power system, the plurality of switched controllable units to implement an MPPT control in response to an assessment that the plurality of controllable units have capacity to absorb the excess power of the DC current source; and causing, by the DC power system, the plurality of switched controllable units to forgo the MPPT control in response to an assessment that the plurality of controllable units do not have capacity to absorb the excess power of the DC current source.

In Example 20, the subject matter of Examples 14-19 includes, wherein the load comprises an electrical grid which includes a power generator.

In Example 21, the subject matter of Examples 14-20 includes, wherein the load comprises an electrical motor which is also a power generator.

In Example 22, the subject matter of Examples 14-21 includes, wherein the load comprises a DC load.

In Example 23, the subject matter of Examples 14-22 includes, wherein the DC current source comprises a photovoltaic (PV) system.

In Example 24, the subject matter of Examples 14-23 includes, wherein the DC current source comprises a fuel cell (FC) system.

In Example 25, the subject matter of Examples 14-24 includes, wherein the second interface comprises an inverter circuit.

In Example 26, the subject matter of Examples 14-25 includes, reading inputs by the DC power system, including: a plurality of sensory inputs including present loading and present temperature information; present-state information including present load demand, power source state, and BCS state; and performance-optimization information including source efficiency data, load efficiency data, and source maximum-power-point data; and further comprising dynamically varying, by the DC power system, the voltage at the input/output interface based on the read inputs.

Example 27 is at least one machine-readable medium including instructions that, when executed by processing circuitry, cause the processing circuitry to perform operations to implement of any of Examples 14-26.

Example 28 is an apparatus comprising means to implement of any of Examples 14-26.

Example 29 is a system to implement of any of Examples 14-26.

CONCLUSION

In the above description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, or communications networks have not been shown or described in detail to avoid unnecessarily obscuring descriptions of the implementations.

The foregoing detailed description has set forth various embodiments of the devices or processes via the use of block diagrams, schematics, and examples. Insofar as such block diagrams, schematics, and examples contain one or more functions or operations, it will be understood by those skilled in the art that each function or operation within such block diagrams, flowcharts, or examples can be implemented, individually or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry or writing the code for the software and or firmware would be well within the skill of one of ordinary skill in the art in light of this disclosure.

In addition, those skilled in the art will appreciate that the mechanisms taught herein are capable of being stored as a program product in a variety of forms, and that an illustrative embodiment applies equally regardless of the particular type of physical storage media used to actually carry out the distribution. Examples of such media include, but are not limited to, the following: read-only memory (ROM), electrically-erasable programmable read-only memory (EEPROM) such as flash device(s), magnetic disk, optical disk, static or dynamic random-access memory (RAM), cache memory, and the like, or any combination of these, or other, media.

U.S. International Patent Application PCT/CA2019/051238, published as WO 2020/047663 is incorporated by reference into the present description.

The various embodiments described above can be combined to provide further embodiments. Aspects of the embodiments can be modified, if necessary, to employ systems, circuits and concepts of the various patents, applications and publications identified herein to provide yet further embodiments.

While there have shown and described and pointed out fundamental novel features as applied to a preferred embodiment thereof, it will be understood that various omissions and substitutions and changes in the form and details of the devices illustrated, and in their operation, may be made by those skilled in the art without departing from their essential teachings. For example, it is expressly intended that all combinations of those elements or method acts that perform substantially the same function in substantially the same way to achieve the same results are within the scope. Moreover, it should be recognized that structures or elements or method acts shown or described in connection with any disclosed form or embodiment may be incorporated in any other disclosed or described or suggested form or embodiment as a general matter of design choice. It is the intention, therefore, to be limited only as indicated by the scope of the claims appended hereto.

The embodiments described herein are not meant to be an exhaustive presentation of the ways in which the various features of the disclosed subject matter may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of 35 U.S.C. § 112(f) are not to be invoked unless the specific terms "means for" or "step for" are recited in a claim.

The invention claimed is:

1. A DC power system comprising:
a first interface to a DC source;
a second interface electrically coupled to the first interface and to a load;
a battery control system (BCS) having an input/output interface electrically coupled to the first interface and to the second interface;
the BCS comprising a series arrangement of a plurality of switched controllable units of one or more battery cells, wherein each controllable unit is switchably bypassable according to a control signal;
the BCS operative to selectively source and sink power so as to variably control a voltage at the input/output interface utilizing the plurality of switched controllable units under control of a BCS processor that produces the control signal;
the BCS processor operative to source power from the plurality of switched controllable units to supply power to the load in addition to, or in lieu of, the DC source; and
the BCS processor operative to regulate electrical performance of an external circuit electrically coupled to the input/output interface by dynamic variation of the voltage at the input/output interface according to the control signal.

2. The DC power system of claim 1, wherein the external circuit is the DC source, and wherein the BCS processor is operative to implement maximum power point tracking (MPPT) control of the DC source by the dynamic variation of the voltage at the input/output interface according to the control signal.

3. The DC power system of claim 1, wherein the external circuit is the DC source, and wherein the BCS processor is operative to implement an efficiency program that matches the voltage at the input/output interface with a voltage range corresponding to a predefined operating point of the DC source according to the control signal.

4. The DC power system of claim 1, wherein the external circuit is the load, and wherein the BCS processor is operative to implement an efficiency program that matches the voltage at the input/output interface with a voltage range corresponding to a predefined operating point of the load according to the control signal.

5. The DC power system of claim 1, wherein the external circuit is a power-converter circuit, and wherein the BCS processor is operative to implement an efficiency program that matches the voltage at the input/output interface with a voltage range corresponding to a predefined operating point of the power-converter circuit according to the control signal.

6. The DC power system of claim 1, wherein:
the BCS processor is operative to assess a power demand of the load, a power capacity of the DC current source, and a present capacity of the plurality of controllable units to absorb excess power of the DC current source which exceeds the power demand of the load;
the BCS processor is operative to cause the plurality of switched controllable units to implement MPPT control in response to an assessment that the plurality of controllable units have capacity to absorb the excess power of the DC current source; and the BCS processor is operative to cause the plurality of switched controllable units to forgo the MPPT control in response to an assessment that the plurality of controllable units do not have capacity to absorb the excess power of the DC current source.

7. The DC power system of claim 1, wherein the load comprises an electrical grid which includes a power generator.

8. The DC power system of claim 1, wherein the load comprises an electrical motor which is also a power generator.

9. The DC power system of claim 1, wherein the load comprises a DC load.

10. The DC power system of claim 1, wherein the DC current source comprises a photovoltaic (PV) system.

11. The DC power system of claim 1, wherein the DC current source comprises a fuel cell (FC) system.

12. The DC power system of claim 1, wherein the second interface comprises an inverter circuit.

13. The DC power system of claim 1, wherein the BCS processor includes an optimization controller that reads inputs including:

a plurality of sensory inputs including present loading and present temperature information;

present-state information including present load demand, power source state, and BCS state; and performance-optimization information including source efficiency data, load efficiency data, and source maximum-power-point data; and wherein the optimization controller is operative to generate the control signal to effect the dynamic variation of the voltage at the input/output interface based on the read inputs.

14. A method for operating a DC power system that includes a DC source, and a series arrangement of a plurality of switched controllable units of one or more battery cells, wherein each controllable unit is switchably bypassable according to a control signal, and an input/output interface that couples the series arrangement to a load, the method comprising:

by the DC power system, selectively sourcing and sinking power so as to variably control a voltage at the input/output interface utilizing the plurality of switched controllable units;

sourcing power, by the DC power system, from the plurality of switched controllable units to supply power to the load in addition to, or in lieu of, the DC source; and regulating, by the DC power system, electrical performance of an external circuit by dynamically varying the voltage at the input/output interface.

15. The method of claim 14, wherein the external circuit is the DC source, and further comprising implementing, by the DC power system, maximum power point tracking (MPPT) control of the DC source by the dynamically varying the voltage at the input/output interface.

16. The method of claim 14, wherein the external circuit is the DC source, and further comprising implementing, by the DC power system, an efficiency program that matches the voltage at the input/output interface with a voltage range corresponding to a predefined operating point of the DC source.

17. The method of claim 14, wherein the external circuit is the load, and further comprising implementing, by the DC power system, an efficiency program that matches the voltage at the input/output interface with a voltage range corresponding to a predefined operating point of the load.

18. The method of claim 14, wherein the external circuit is a power-converter circuit, and further comprising implementing, by the DC power system, an efficiency program that matches the voltage at the input/output interface with a voltage range corresponding to a predefined operating point of the power-converter circuit.

19. The method of claim 14, further comprising:

assessing, by the DC power system, a power demand of the load, a power capacity of the DC current source, and a present capacity of the plurality of controllable units to absorb excess power of the DC current source which exceeds the power demand of the load;

causing, by the DC power system, the plurality of switched controllable units to implement an MPPT control in response to an assessment that the plurality of controllable units have capacity to absorb the excess power of the DC current source; and causing, by the DC power system, the plurality of switched controllable units to forgo the MPPT control in response to an assessment that the plurality of controllable units do not have capacity to absorb the excess power of the DC current source.

20. The method of claim 14, wherein the load comprises an electrical grid which includes a power generator.

21. The method of claim 14, wherein the load comprises an electrical motor which is also a power generator.

22. The method of claim 14, wherein the load comprises a DC load.

23. The method of claim 14, wherein the DC current source comprises a photovoltaic (PV) system.

24. The method of claim 14, wherein the DC current source comprises a fuel cell (FC) system.

25. The method of claim 14, wherein the second interface comprises an inverter circuit.

26. The method of claim 14, further comprising reading inputs by the DC power system, including:

a plurality of sensory inputs including present loading and present temperature information;

present-state information including present load demand, power source state, and BCS state; and performance-optimization information including source efficiency data, load efficiency data, and source maximum-power-point data; and further comprising dynamically varying, by the DC power system, the voltage at the input/output interface based on the read inputs.

* * * * *